3,005,814
METAL-CONTAINING POLYAZO DYESTUFFS
August Schweizer, Muttenz, and Walter Wehrli, Riehen, Switzerland, assignors to Sandoz A.G., Basel, Switzerland
No Drawing. Filed Dec. 2, 1957, Ser. No. 699,949
Claims priority, application Switzerland Dec. 5, 1956
7 Claims. (Cl. 260—145)

The present invention relates to metal-containing polyazo dyestuffs of the general formula

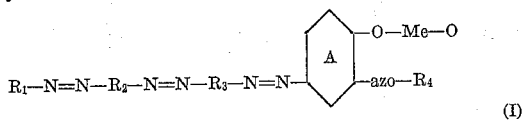

wherein:

$R_1$, $R_2$ and $R_3$ stand for radicals of the benzene or naphthalene series which together contain at least two sulfonic acid groups, $R_4$ for a naphthalene radical which may be further substituted, which contains at least one water-solubilizing group and which links the two groups -azo- and —O—Me— in ortho-position to each other, Me for one copper or nickel atom, and wherein the nucleus A may be further substituted by alkyl or alkoxy.

The dyestuffs must contain 3 or 4 water-solubilizing groups to render them water-soluble.

Especially valuable dyestuffs are the metal-containing polyazo dyestuffs of Formula I in which $R_1$ stands for a naphthalene radical containing two sulfonic acid groups and $R_2$ and $R_3$ stand for radicals of the benzene series.

The process for the production of the polyazo dyestuffs and their metal-complex compounds consists in coupling 1 mol of the diazo compound of an aminotrisazo dyestuff of the formula

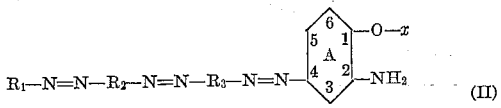

wherein $R_1$, $R_2$, $R_3$ and A have the aforecited meanings, and x stands for hydrogen, methyl or acyl, with 1 mol of a hydroxynaphthalene which couples in ortho-position to the hydroxy group which contains at least one water-solubilizing group, and which may be further substituted, and treating the resultant tetrakisazo dyestuff, which must contain the number of water-solubilizing groups necessary for water-solubility, with a copper- or nickel-yielding agent. When x stands for methyl or acyl, this group must be split off before or during metallization.

The aminotrisazo dyestuffs of general Formula II which are used as reactants can be produced, for example, by coupling the diazo compounds of aminodisazo dyestuffs of the general formula $$R_1-N=N-R_2-N=N-R_3-NH_2 \quad (III)$$

wherein $R_1$, $R_2$ and $R_3$ have the aforenamed meanings, with N-acetylated o-aminophenols in alkaline solution, upon which the diazo group enters into para-position to the hydroxy group of the aminophenol. The acetyl group in the resultant trisazo dyestuff is then split off.

When the x in the aminotrisazo dyestuffs of general Formula II stands for methyl or acyl, the diazotized dyestuffs exhibit greater coupling energy than those aminotrisazo dyestuffs in which x represents hydrogen. The former are obtained by etherizing the hydroxy group of the acetylaminohydroxybenzene radical with methyl-yielding agents prior to splitting off of the acetyl group, or alternatively by acylating it with alkylsulfonyl or arylsulfonyl halides.

The operating procedure of the process is as follows. The aminotrisazo dyestuffs of Formula II are either suspended in a dilute mineral acid and directly diazotized, or in the form of their neutral ammonium, sodium or potassium salts they are dissolved in water and indirectly diazotized. The diazo compounds thus obtained are preferably filtered and employed in coupling as concentrated aqueous pastes. The diazo compound enters the hydroxynaphthalene in the ortho-position to the hydroxy group. Coupling is conducted preferably in alkaline solution and if desired in the presence of organic bases, e.g. pyridine. The metal-free polyazo dyestuff so formed is isolated by neutralizing the coupling solution and/or salting out and filtering. If desired it can be purified by redissolving and reprecipitation.

Metallization is carried out with copper- or nickel-yielding agents, preferably in the presence of ammonia and organic bases, for example mono- or diethanolamine, morpholine or pyridine. When x stands for a methyl or acyl group—preferably for the radical of an aliphatic or aromatic sulfonic acid group in this case—metallization must be effected under conditions which permit removal of these groups. The acyl group can be readily split off before metallizing by heating the polyazo dyestuff for a short time in an alkaline, e.g. soda-alkaline, solution. In most cases the preferred procedure will be to split off the acyl group in the coupling solution after completion of the coupling reaction giving the polyazo dyestuff.

The new metal-containing polyazo dyestuffs produced by the present process possess good solubility in water; their solutions are stable to additions of alkali-metal salts and to calcium salts. The dyestuffs dye animal fibers such as wool, silk, and also leather, in brown to gray shades. They possess notably high substantivity and are suitable for dyeing and printing fibers of natural or regenerated cellulose such as cotton, hemp, flax, spun viscose and filament viscose rayon. On these materials they yield level shades of brown to gray which are fast to light, washing and perspiration, and stable to crease-resistant finishing processes. They can be discharged to white with a neutral or alkaline discharge paste. The dyeings are only very slightly sensitive to metals; they possess good fastness to water, sulfite, formaldehyde, rubbing, wet pressing, and boiling in neutral and alkaline baths. Their light and wet fastness can be improved by aftertreatment with a polyalkylene-polyamine in presence of a copper salt; this treatment also renders the dyeings fast to scrooping and stable to heat.

In the following examples the parts and percentages are by weight and the temperatures in degrees centigrade.

*Example 1*

30.5 parts of the aminotrisazo dyestuff of the formula

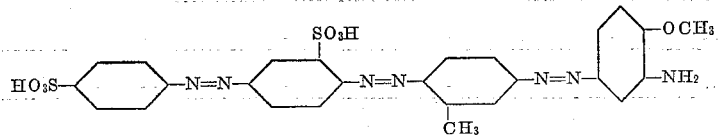

in the form of the sodium salt are dissolved in 750 parts of hot water. The solution is cooled to 15° and mixed with a concentrated aqueous solution of 3.5 parts of sodium nitrite. Then 15 parts of hydrochloric acid 30% are added to it with constant stirring. The diazo compound thus formed is obtained as a brown precipitate. After ½ to 1 hour diazotiation is completed. The diazo suspension at 5-10° is then run into a solution of 16 parts of 2-phenylamino-8-hydroxynaphthalene-6-sulfonic acid and 20 parts of sodium carbonate in 200 parts of water. On completion of coupling the polyazo dyestuff is salted out from the reaction solution, filtered off and washed with a diluted solution of common salt.

The filter cake is dissolved in 1000 parts of water at 90° for conversion into the copper complex compound. To this solution are added 50 parts of a 25% aqueous solution of ammonia and 25 parts of diethanolamine. Subsequently a concentrated aqueous solution of 12.5 parts of crystalline copper sulfate is poured into the solution, and the reaction mixture is stirred at 90° until the methoxy group is completely split off and the copper complex compound of the polyazo dyestuff is formed. This is precipitated by the addition of sodium chloride and is then filtered off, washed and dried.

The copper-containing polyazo dyestuff is a dark brown powder which gives a violettish brown solution in water and a blue-violet solution in concentrated sulfuric acid. It has good affinity for cotton and fibers of regenerated cellulose, and gives fast-to-light dark brown shades which have good stability to crease-resistant finishing processes.

*Example 2*

33 parts of the aminotrisazo dyestuff of the formula

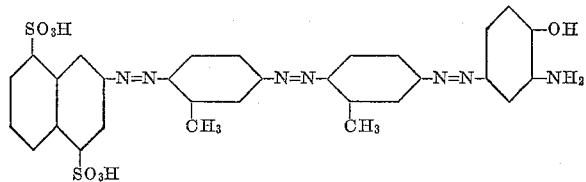

in the form of the sodium salt are dissolved in 600 parts of hot water. On cooling to 20° the dyestuff is diazotized indirectly according to the particulars of Example 1. The precipitated diazo compound is then filtered off. A solution of 11.2 parts of 2-hydroxynaphthalene-4-sulfonic acid, 10 parts of sodium carbonate and 50 parts of a mixture of pyridine bases in 200 parts of water is cooled to 0-5° with ice, and the moist filter cake is added to it with thorough stirring. On completion of coupling the solution is weakly acidified with hydrochloric acid and the precipitated polyazo dyestuff is filtered off.

The metal-free polyazo dyestuff is dissolved in 750 parts of water at 70°. The solution is given 10 parts of sodium acetate and a solution of 12.5 parts of crystalline copper sulfate, and the whole is stirred for 30 minutes. In this way a copper complex compound is formed which on drying is obtained as a brown-black powder. It dissolves in water with a red-brown, and in concentrated sulfuric acid with a reddish blue, coloration. It has very good affinity for cotton and fibers of regenerated cellulose. It dyes these fibers in dark brown shades which possess very good light and washing fastness and good stability to crease-resistant finishing processes.

Further examples are set out in the table below. The aminotrisazo dyestuffs used as diazo compounds correspond to Formula II. The meanings of $R_1$, $R_2$, $R_3$ and $x$ are given in the appropriate columns; under $R_1$, $R_2$ and $R_3$ the basic compounds corresponding to the radicals are named. The next columns contain details of the nature and the position of the substituents in the nucleus A, the azo component (a hydroxynaphthalene, which may be substituted), the metal-yielding agent, and the shade of the metal-containing dyestuff on cotton.

| Ex. No. | $R_1$ (I) | $R_2$ (II) | $R_3$ (III) | $x$ (IV) | Substituent in A Nature (Va) | Substituent in A Position (Vb) | Azo component (VI) | Metal (VIIa) | Shade of the metal-containing dyestuff on cotton (VIIb) |
|---|---|---|---|---|---|---|---|---|---|
| 3 | 1-aminobenzene-4-sulfonic acid. | 1-aminobenzene-2-sulfonic acid. | 1-amino-3-methylbenzene. | H | | | 2-hydroxynaphthalene-6-carboxylic acid. | Cu | Red-brown. |
| 4 | ___do___ | ___do___ | ___do___ | H | $CH_3$ | 6 | 2-hydroxynaphthalene 4-sulfonic acid. | Cu | Violettish brown. |
| 5 | ___do___ | ___do___ | ___do___ | $CH_3$ | | | 2-hydroxynaphthalene-6-sulfonic acid. | Cu | Do. |
| 6 | ___do___ | ___do___ | ___do___ | $-SO_2-\text{C}_6\text{H}_4-CH_3$ | | | ___do___ | Cu | Do. |
| 7 | ___do___ | ___do___ | ___do___ | H | | | 2-benzoylamino-6-hydroxynaphthalene-8-sulfonic acid. | Cu | Grayish brown. |
| 8 | ___do___ | ___do___ | ___do___ | H | | | 1-hydroxynaphthalene-3-sulfonic acid. | Ni | Violettish brown. |
| 9 | ___do___ | ___do___ | ___do___ | H | $OC_2H_5$ | 5 | 1-hydroxynaphthalene-4-sulfonic acid. | Cu | Dark reddish brown. |
| 10 | ___do___ | ___do___ | ___do___ | H | | | 1-hydroxynaphthalene-5-sulfonic acid. | Cu | Dark brown. |
| 11 | ___do___ | ___do___ | ___do___ | $SO_2-CH_3$ | | | 2-benzoylamino-8-hydroxynaphthalene-6-sulfonic acid. | Cu | Violet brown. |
| 12 | ___do___ | ___do___ | ___do___ | H | $C_2H_5$ | 5 | 1-acetylamino-8-hydroxynaphthalene-4-sulfonic acid. | Cu | Dark brown. |
| 13 | ___do___ | ___do___ | ___do___ | $CH_3$ | | | 5-hydroxy-1.2:1′.2′-phenonaphthazine-7-sulfonic acid. | Cu | Gray. |

| Ex. No. | R₁ (I) | R₂ (II) | R₃ (III) | x (IV) | Substituent in A Nature (Va) | Substituent in A Position (Vb) | Azo component (VI) | Metal (VIIa) | Shade of the metal-containing dyestuff on cotton (VIIb) |
|---|---|---|---|---|---|---|---|---|---|
| 14 | 1-aminobenzene-4-sulfonic acid. | 1-aminobenzene-2-sulfonic acid. | 1-amino-3-methyl-benzene | CH₃ | | | 5-hydroxy-1.2:1'.2'-phenonaphtha-zine-4'.7-disulfonic acid. | Cu | Do. |
| 15 | 1-aminobenzene-3-sulfonic acid. | ...do... | ...do... | CH₃ | | | ...do... | Cu | Do. |
| 16 | 2-aminonaphthalene-4.8-disulfonic acid. | 1-amino-3-methyl-benzene. | ...do... | CH₃ | | | 2-hydroxynaphthalene-3-carboxylic acid. | Cu | Red brown. |
| 17 | 2-aminonaphthalene-6.8-disulfonic acid. | ...do... | ...do... | CH₃ | | | 2-hydroxynaphthalene-6-sulfonic acid. | Cu | Do. |
| 18 | 2-aminonaphthalene-4.8-disulfonic acid. | ...do... | ...do... | H | | | ...do... | Cu | Do. |
| 19 | ...do... | ...do... | ...do... | H | | | 1-hydroxynaphthalene-4-sulfonic acid. | Cu | Violettish brown. |
| 20 | ...do... | ...do... | ...do... | H | | | 1-hydroxynaphthalene-5-sulfonic acid. | Ni | Do. |
| 21 | 2-aminonaphthalene-6.8-disulfonic acid. | ...do... | ...do... | H | | | 2-hydroxynaphthalene-3.6-disulfonic acid. | Cu | Do. |
| 22 | 2-aminonaphthalene-4.8-disulfonic acid. | ...do... | ...do... | H | | | 2-(3'-nitro)-benzoyl-amino-6-hydroxy-naphthalene-8-sulfonic acid. | Cu | Dark brown. |
| 23 | ...do... | ...do... | ...do... | CH₃ | | | 2-phenylamino-8-hydroxynaphthalene-3',6-disulfonic acid. | Cu | Do. |
| 24 | ...do... | ...do... | ...do... | H | | | 1-propionylamino-8-hydroxynaphthalene-4-sulfonic acid. | Cu | Violettish brown. |
| 25 | ...do... | ...do... | ...do... | CH₃ | | | 2-(3'-chloro)-phenyl-amino-8-hydroxy-naphthalene-6-sulfonic acid. | Cu | Dark brown. |
| 26 | 1-aminonaphthalene-5-sulfonic acid. | 1-aminonaphthalene-6-sulfonic acid. | 1-aminonaphthalene-6-sulfonic acid. | H | | | 2-hydroxynaphthalene-4-sulfonic acid. | Cu | Gray-violet. |
| 27 | aminobenzene. | ...do... | ...do... | H | | | ...do... | Cu | Brownish violet. |
| 28 | 1-amino-4-methyl-benzene. | ...do... | ...do... | CH₃ | | | ...do... | Cu | Do. |
| 29 | 1-amino-3-chloro-benzene. | ...do... | ...do... | CH₃ | | | 2-(4'-methyl)-phenylamino-5-hydroxynaphthalene-7-sulfonic acid. | Cu | Gray-violet. |
| 30 | 1-amino-2.4-dimethylbenzene-6-sulfonic acid. | 1-aminonaphthalene-7-sulfonic acid. | 1-aminonaphthalene. | CH₃ | | | 2-hydroxynaphthalene-6-sulfonic acid. | Cu | Brownish violet. |
| 31 | 1-amino-2-methoxy-4-nitrobenzene-5-sulfonic acid. | 1-aminonaphthalene. | 1-aminonaphthalene-7-sulfonic acid. | H | | | ...do... | Cu | Do. |
| 32 | 1-aminonaphthalene-4-sulfonic acid. | 1-aminonaphthalene-6-sulfonic acid. | 1-amino-2-methoxybenzene. | H | | | 2-hydroxynaphthalene-4-sulfonic acid. | Cu | Gray-violet. |
| 33 | 1-aminobenzene-2.5-disulfonic acid. | 1-amino-3-methylbenzene. | 1-amino-2-methylbenzene. | CH₃ | | | ...do... | Cu | Dark brown. |
| 34 | ...do... | 1-aminobenzene. | 1-amino-2-methoxy-5-methylbenzene. | H | | | 1-hydroxynaphthalene-4-sulfonic acid. | Cu | Do. |
| 35 | ...do... | 1-amino-3-chloro-benzene. | 1-aminobenzene. | CH₃ | | | ...do... | Cu | Do. |
| 36 | 1-aminobenzene-3-sulfonic acid. | 1-aminonaphthalene-7-sulfonic acid. | 1-amino-3-methoxybenzene. | CH₃ | | | 2-butyrylamino-5-hydroxynaphthalene-7-sulfonic acid. | Cu | Gray-violet. |
| 37 | 1-aminonaphthalene-3.6.8-trisulfonic acid. | 1-amino-2.5-dimethylbenzene. | 1-amino-2.5-dimethylbenzene. | CH₃ | | | 2-benzoylamino-5-hydroxynaphthalene-7-sulfonic acid. | Cu | Dark brown. |
| 38 | 1-aminobenzene-2.4-disulfonic acid. | 1-amino-2.5-dimethoxybenzene. | 1-amino-2-ethylbenzene. | CH₃ | | | 2-(2'-chloro)-benzoylamino-5-hydroxy-naphthalene-7-sulfonic acid. | Cu | Do. |
| 39 | 1-aminonaphthalene-3.6-disulfonic acid. | 1-amino-3-methoxybenzene. | 1-amino-3-methylbenzene. | CH₃ | | | 2-hydroxynaphthalene-6-sulfonic acid. | Cu | Red-brown. |
| 40 | 1-aminonaphthalene-3.8-disulfonic acid. | 1-amino-3-methylbenzene. | ...do... | CH₃ | | | ...do... | Cu | Do. |
| 41 | 1-aminonaphthalene-4.8-disulfonic acid. | ...do... | ...do... | CH₃ | | | ...do... | Cu | Do. |
| 42 | 2-aminonaphthalene-1.5-disulfonic acid. | 1-amino-3-ethylbenzene. | 1-amino-3-chlorobenzene. | CH₃ | | | 1-hydroxynaphthalene-5-sulfonic acid. | Cu | Dark brown. |
| 43 | 2-aminonaphthalene-3.6-disulfonic acid. | 1-amino-3-methylbenzene. | 1-aminobenzene. | CH₃ | | | ...do... | Cu | Do. |
| 44 | 2-aminonaphthalene-5.7-disulfonic acid. | ...do... | ...do... | CH₃ | | | 2-hydroxynaphthalene-6-carboxylic acid. | Cu | Red-brown. |

| Ex. No. | R₁ (I) | R₂ (II) | R₃ (III) | z (IV) | Substituent in A Nature (Va) | Substituent in A Position (Vb) | Azo component (VI) | Metal (VIIa) | Shade of the metal-containing dyestuff on cotton (VIIb) |
|---|---|---|---|---|---|---|---|---|---|
| 45 | 2-aminonaphthalene-3.6.8-trisulfonic acid. | 1-aminonaphthalene. | 1-aminonaphthalene. | CH₃ | | | 2-phenylamino-5-hydroxynaphthalene-7-sulfonic acid. | Cu | Gray. |
| 46 | 2-aminonaphthalene-6.8-disulfonic acid. | ____do____ | ____do____ | CH₃ | | | 1-benzoylamino-8-hydroxynaphthalene-3.6-disulfonic acid. | Cu | Do. |
| 47 | 1-aminonaphthalene-5-sulfonic acid. | 1-aminonaphthalene-6-sulfonic acid. | ____do____ | CH₃ | | | ____do____ | Cu | Do. |
| 48 | ____do____ | ____do____ | 1-aminonaphthalene-7-sulfonic acid. | CH₃ | CH₃O | 5 | 1-acetylamino-8-hydroxynaphthalene-4-sulfonic acid. | Cu | Do. |

Example 49

100 parts of cotton fabric are wetted out and entered into a dyebath at 30° composed of 3000 parts of soft water, 2 parts of anhydrous sodium carbonate and 0.6 part of the metal-containing polyazo dyestuff obtainable according to Example 2. An addition of 10 parts of sodium sulfate is made, then the dyebath is heated to 100° in the course of 30 minutes, two additions of 10 parts of sodium sulfate being made at 50° and 70°. After reaching 100° the bath is maintained at the same temperature for 15 minutes. At this point another 10 parts of sodium sulfate are added and the bath then allowed to cool. At 50° the dyed cotton is removed, rinsed well in cold water and dried at 60°. It is dyed in a dark brown shade which is fast to light, washing and perspiration.

A yet higher standard fastness to light, washing and perspiration is achieved when the dyeing is treated with a polyalkylenepolyamine in presence of a copper salt. After rinsing, the dyed material is entered into an aftertreating bath containing 3000 parts of water and 2 parts of a cupriferous polyalkyleneployamine and treated therein for 30 minutes at 70°. The cotton is then removed, rinsed in cold water and dried at 60°. The dyeing has very good fastness to light, washing and perspiration.

Formulae of representative dyestuffs of the foregoing examples are as follows:

Example 1

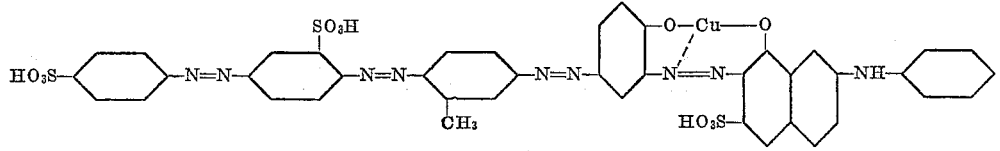

Example 2

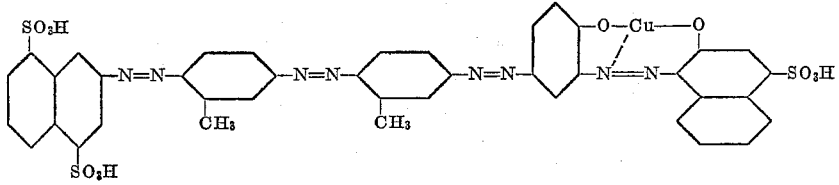

Example 16

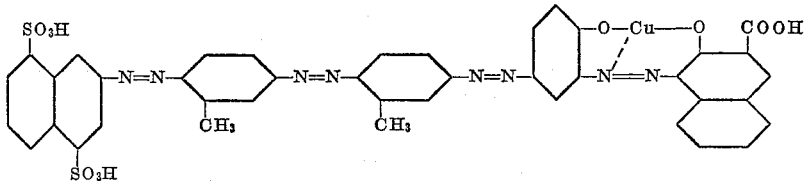

Example 17

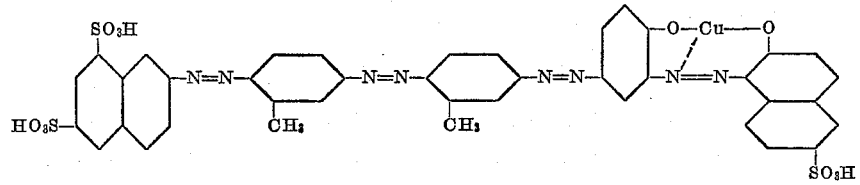

Example 18

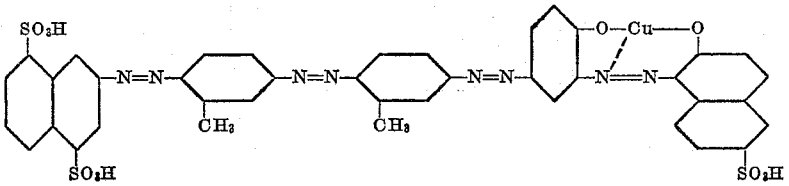

Example 19

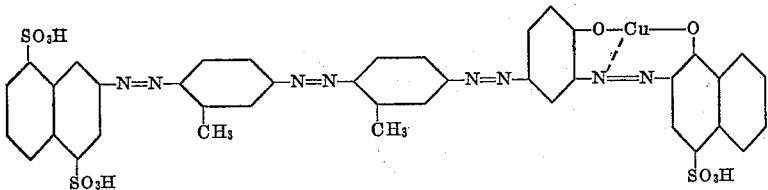

Example 23

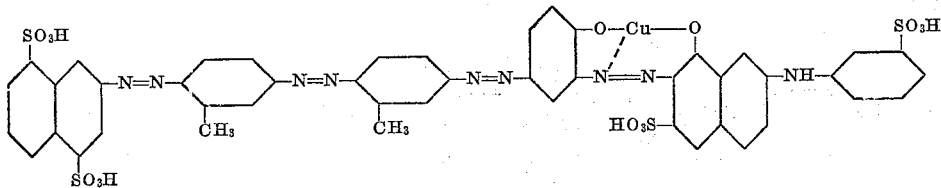

Having thus disclosed the invention what is claimed is:

1. A metal-containing polyazo dyestuff of the formula

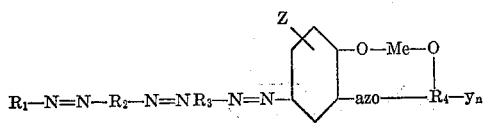

wherein:

$R_1$ stands for a member selected from the group consisting of phenyl, mono-, di- and tri-substituted phenyl, and a sulfonaphthyl with from one to three sulfonic acid groups, the substituted phenyl being substituted with at least one member selected from the group consisting of methyl, methoxy, nitro, sulfonic acid groups and chlorine;

$R_2$ stands for a member selected from the group consisting of phenyl, mono- and di-substituted phenyl, naphthyl, and monosulfonaphthyl, the substituted phenyl being substituted with at least one member selected from the group consisting of methyl, ethyl, methoxy, sulfonic acid groups and chlorine;

$R_3$ stands for a member selected from the group consisting of phenyl, mono- and di-substituted phenyl, naphthyl and monosulfonaphthyl, the substituted phenyl being substituted with at least one member selected from the group consisting of methyl, ethyl, methoxy and chlorine;

the total number of sulfonic acid groups contained in $R_1$, $R_2$, and $R_3$ being from two to three;

$R_4$ represents a naphthalene radical linking both the groups -azo- and —O—Me— in ortho-position to each other and which is selected from the group consisting of naphthalene, lower alkanoylaminonaphthalene, benzoylaminonaphthalene, chlorobenzoylaminonaphthalene, nitrobenzoylaminonaphthalene, mononuclear arylaminonaphthalene, and phenonaphthazine.

$y$ represents a water-solubilizing group, $z$ represents a member selected from the group consisting of hydrogen, lower alkyl and lower alkoxy, Me represents a member selected from the group consisting of a copper atom and a nickel atom, and $n$ stands for one of the integers 1 and 2.

2. A copper-containing polyazo dyestuff which corresponds to the formula

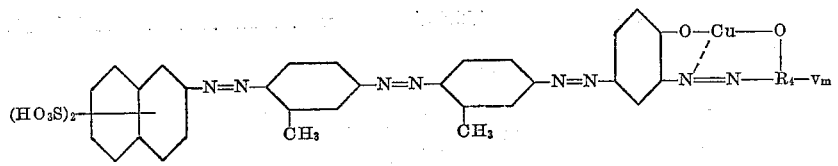

wherein:

$R_4$ represents a naphthalene radical linking both the groups -azo- and —O—Cu— in ortho-position to each other and which is selected from the group consisting of naphthalene, lower alkanoylaminonaphthalene, benzoylaminonaphthalene, chlorobenzoylaminonaphthalene, nitrobenzoylaminonaphthalene, mononuclear arylaminonaphthalene and phenonaphthazine, $v$ stands for a member selected from the group consisting of a sulfonic acid and a carboxylic acid group, and $m$ stands for one of the integers 1 and 2.

3. The copper-containing polyazo dyestuff which corresponds to the formula

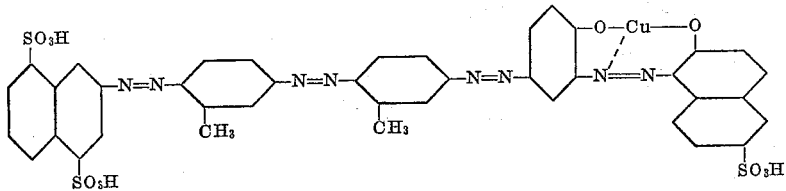

4. The copper-containing polyazo dyestuff which corresponds to the formula

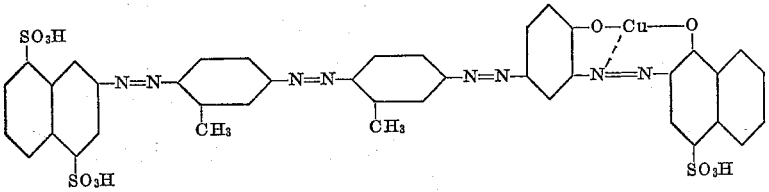

5. The copper-containing polyazo dyestuff which corresponds to the formula
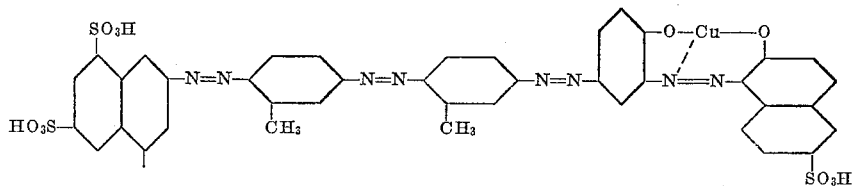
6. The copper-containing polyazo dyestuff which corresponds to the formula
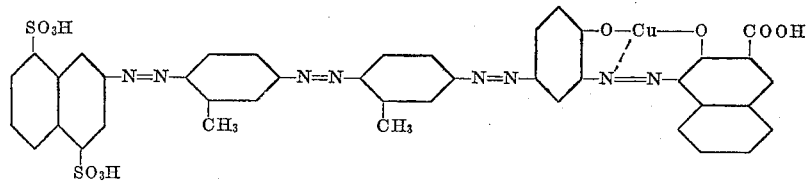
7. The copper-containing polyazo dyestuff which corresponds to the formula
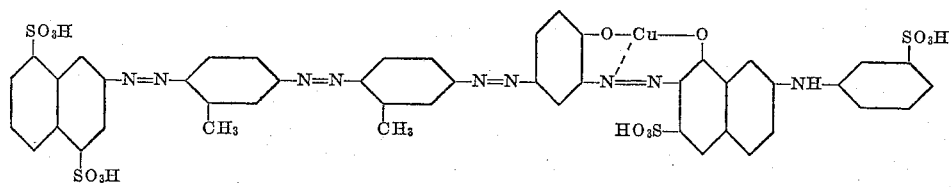
References Cited in the file of this patent
UNITED STATES PATENTS
2,242,456    Delfs et al. _____ May 20, 1941
FOREIGN PATENTS
466,545    Canada _____ July 11, 1950